United States Patent
Isaksson

(10) Patent No.: US 10,263,875 B2
(45) Date of Patent: *Apr. 16, 2019

(54) REAL-TIME PROCESSING CAPABILITY BASED QUALITY ADAPTATION

(71) Applicant: MobiTV, Inc., Emeryville, CA (US)

(72) Inventor: Tommy Isaksson, San Francisco, CA (US)

(73) Assignee: MobiTV, Inc., Emeryville, CA (US)

( * ) Notice: Subject to any disclaimer, the term of this patent is extended or adjusted under 35 U.S.C. 154(b) by 486 days.

This patent is subject to a terminal disclaimer.

(21) Appl. No.: 14/635,877

(22) Filed: Mar. 2, 2015

(65) Prior Publication Data

US 2015/0172161 A1 Jun. 18, 2015

Related U.S. Application Data

(63) Continuation of application No. 13/090,959, filed on Apr. 20, 2011, now Pat. No. 8,990,351.

(51) Int. Cl.
*G06F 15/16* (2006.01)
*H04L 12/26* (2006.01)
(Continued)

(52) U.S. Cl.
CPC .......... *H04L 43/16* (2013.01); *H04L 47/2416* (2013.01); *H04L 47/26* (2013.01); *H04L 47/30* (2013.01); *H04L 47/38* (2013.01); *H04N 21/2393* (2013.01); *H04N 21/23439* (2013.01); *H04N 21/234318* (2013.01); *H04N 21/2402* (2013.01); *H04N 21/25808* (2013.01); *H04N 21/25825* (2013.01); *H04N 21/25833* (2013.01);
(Continued)

(58) Field of Classification Search
None
See application file for complete search history.

(56) References Cited

U.S. PATENT DOCUMENTS

| 6,701,483 B1 | 3/2004 | Heegard et al. |
| 8,954,876 B1 * | 2/2015 | Hobbs ..................... G06F 9/452 715/772 |

(Continued)

FOREIGN PATENT DOCUMENTS

| DE | 112012001770 T5 | 1/2014 |
| GB | 2505113 | 2/2014 |
| WO | 2012145249 A1 | 10/2012 |

OTHER PUBLICATIONS

"United Kingdom Application Serial No. 1319806.4, Office Action dated Aug. 10, 2016", 2 pgs.

(Continued)

*Primary Examiner* — Dhairya A Patel
(74) *Attorney, Agent, or Firm* — Kwan & Olynick LLP

(57) ABSTRACT

The quality of a media stream transmitted to a client device is dynamically adapted based on real-time availability of resources on the client device. Central processing unit resources, memory availability, buffer usage, graphics processing unit usage, etc., are continuously monitored to evaluate the ability of a device to handle media streams of particular quality levels. When it is determined that resources at a client device temporarily can not handle a high quality media stream, a lower quality stream is selected and provided to the client device without having to establish a new session.

16 Claims, 7 Drawing Sheets

| Processor Usage 101 | Processor Usage History 111 | Processor Usage Threshold 121 |
| Memory Usage 103 | Memory Usage History 113 | Memory Usage Threshold 123 |
| Decoder Delay 105 | Decoder Delay History 115 | Decoder Delay Threshold 125 |
| Decoder Frame Drops 107 | Decoder Frame Drop History 117 | Decoder Frame Drop Threshold 127 |

(51) Int. Cl.

| | | |
|---|---|---|
| *H04L 12/853* | (2013.01) | |
| *H04L 12/825* | (2013.01) | |
| *H04L 12/835* | (2013.01) | |
| *H04L 12/811* | (2013.01) | |
| *H04N 21/258* | (2011.01) | |
| *H04N 21/2662* | (2011.01) | |
| *H04N 21/44* | (2011.01) | |
| *H04N 21/442* | (2011.01) | |
| *H04N 21/6373* | (2011.01) | |
| *H04N 21/854* | (2011.01) | |
| *H04N 21/2343* | (2011.01) | |
| *H04N 21/239* | (2011.01) | |
| *H04N 21/24* | (2011.01) | |
| *H04N 21/437* | (2011.01) | |
| *H04N 21/61* | (2011.01) | |
| *H04N 21/6377* | (2011.01) | |
| *H04L 29/06* | (2006.01) | |

(52) U.S. Cl.
CPC ... *H04N 21/25866* (2013.01); *H04N 21/2662* (2013.01); *H04N 21/437* (2013.01); *H04N 21/44004* (2013.01); *H04N 21/4424* (2013.01); *H04N 21/6125* (2013.01); *H04N 21/6373* (2013.01); *H04N 21/6377* (2013.01); *H04N 21/85406* (2013.01); *H04L 29/06476* (2013.01)

(56) References Cited

U.S. PATENT DOCUMENTS

| | | | |
|---|---|---|---|
| 8,990,351 B2 | 3/2015 | Isaksson | |
| 2004/0049598 A1* | 3/2004 | Tucker | G06F 17/30899 709/246 |
| 2005/0021830 A1 | 1/2005 | Urzaiz et al. | |
| 2005/0238097 A1 | 10/2005 | Youn et al. | |
| 2006/0015773 A1* | 1/2006 | Singh | G06F 11/2028 714/13 |
| 2007/0147344 A1* | 6/2007 | Sundqvist | H04L 12/1877 370/352 |
| 2008/0205389 A1* | 8/2008 | Fang | H04L 65/80 370/389 |
| 2009/0092183 A1* | 4/2009 | O'Hern | H04N 21/2407 375/240.01 |
| 2009/0100493 A1* | 4/2009 | Jones | H04N 21/235 725/131 |
| 2009/0150736 A1* | 6/2009 | Nebat | H04L 1/0084 714/748 |
| 2009/0193438 A1* | 7/2009 | Jin | H04L 12/2838 719/318 |
| 2009/0259765 A1* | 10/2009 | Karlsson | H04L 65/4092 709/231 |
| 2009/0300203 A1 | 12/2009 | Virdi et al. | |
| 2010/0074326 A1* | 3/2010 | Sathianathan | H04N 19/176 375/240.03 |
| 2010/0166063 A1 | 7/2010 | Perlman et al. | |
| 2011/0066673 A1 | 3/2011 | Outlaw | |
| 2011/0231519 A1* | 9/2011 | Luby | H04N 21/23106 709/219 |
| 2011/0307900 A1* | 12/2011 | Fatehpuria | G06F 9/50 718/104 |
| 2011/0314071 A1* | 12/2011 | Johnson | G06F 17/30091 707/827 |
| 2012/0051440 A1* | 3/2012 | Parfenov | H04N 19/159 375/240.26 |
| 2012/0087415 A1* | 4/2012 | Rabii | G06F 1/3212 375/240.25 |
| 2012/0195356 A1* | 8/2012 | Yi | H04N 19/119 375/224 |
| 2012/0206610 A1* | 8/2012 | Wang | H04N 17/004 348/184 |
| 2012/0271920 A1 | 10/2012 | Isaksson | |

OTHER PUBLICATIONS

"United Kingdom Application Serial No. 1319806.4, Office Action dated Nov. 22, 2016", 1 pg.

"U.S. Appl. No. 13/090,959, Advisory Action dated May 28, 2013".

"U.S. Appl. No. 13/090,959, Non Final Office Action dated Apr. 10, 2014".

"U.S. Appl. No. 13/090,959, Notice of Allowance dated Nov. 19, 2014".

"International Application Serial No. PCT/US2012/033603, Search Report and Written Opinion dated Jul. 5, 2012".

"Int'l Application Serial No. PCT/US2012/033603, Preliminary Report on Patentability dated Oct. 31, 2013".

"United Kingdom Application Serial No. 1319806.4, Office Action dated Apr. 28, 2017", 3 pgs.

\* cited by examiner

| Processor Usage 101 | Processor Usage History 111 | Processor Usage Threshold 121 |
|---|---|---|
| Memory Usage 103 | Memory Usage History 113 | Memory Usage Threshold 123 |
| Decoder Delay 105 | Decoder Delay History 115 | Decoder Delay Threshold 125 |
| Decoder Frame Drops 107 | Decoder Frame Drop History 117 | Decoder Frame Drop Threshold 127 |

Figure 1

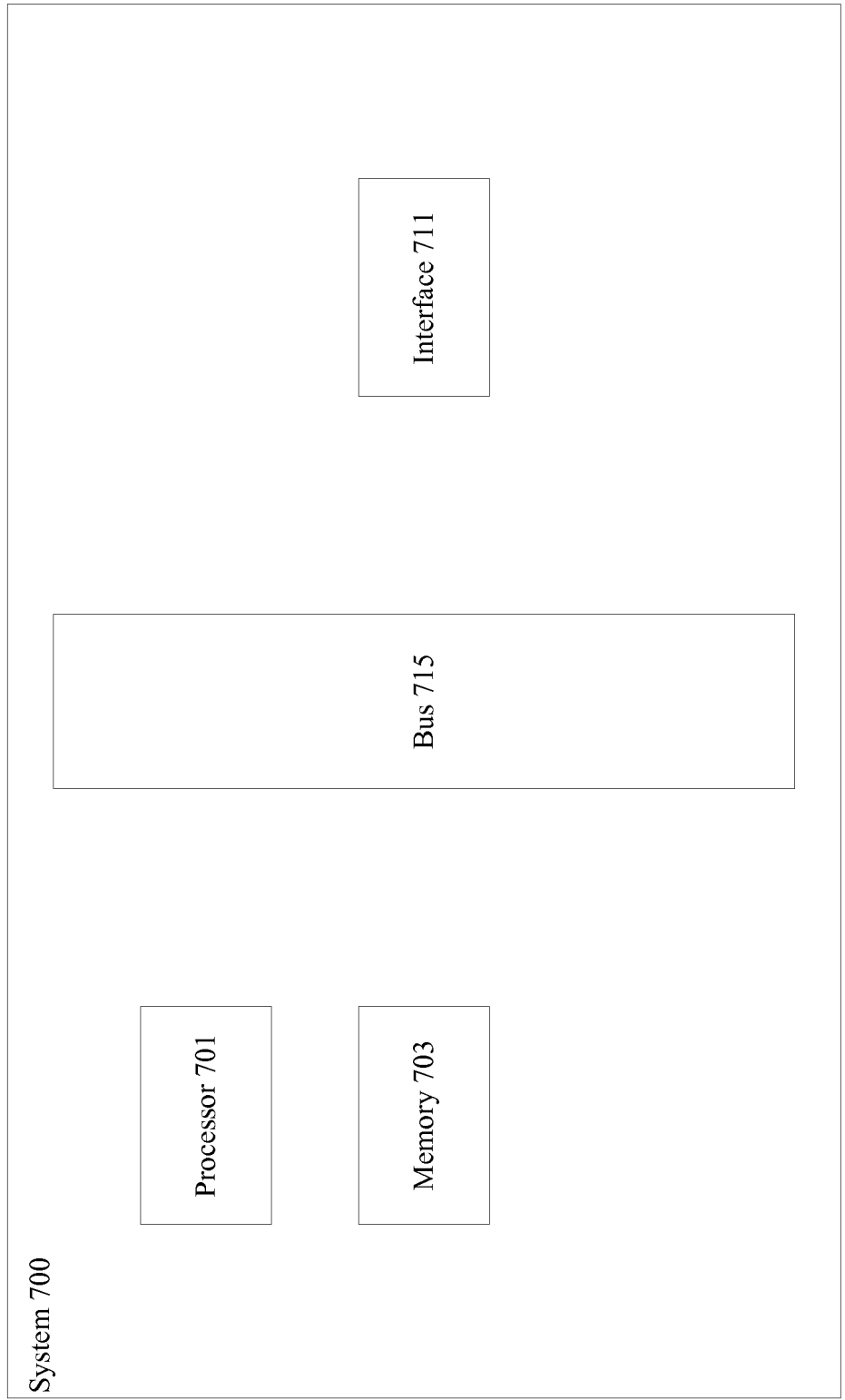

REAL-TIME PROCESSING CAPABILITY BASED QUALITY ADAPTATION

CROSS-REFERENCE TO RELATED APPLICATIONS

This application is a continuation of and claims priority to U.S. patent application Ser. No. 13/090,959, filed on Apr. 20, 2011 by Tommy Isaksson, which is hereby incorporated by reference in its entirety and for all purposes.

TECHNICAL FIELD

The present disclosure relates to real-time processing capability based quality adaptation.

DESCRIPTION OF RELATED ART

Video quality on a client device depends on a variety of factors. In some examples, client devices may receive media over networks that have varying transmision rates, bandwidth, latency, and reliability. Client devices may also have different processing, graphics, display, memory, and buffer capabilities. It is typically difficult to provide smooth playback in a variety of conditions and use cases.

Conventional techniques and mechanisms for presenting media on client devices such as mobile devices are limited. Consequently, it is desirable to provide improved techniques and mechanisms for improving media playback at a client.

BRIEF DESCRIPTION OF THE DRAWINGS

The disclosure may best be understood by reference to the following description taken in conjunction with the accompanying drawings, which illustrate particular embodiments.

FIG. 1 illustrates one example of a hardware specification monitoring mechanism.

FIG. 7 illustrates one example of a system.

DESCRIPTION OF EXAMPLE EMBODIMENTS

Figure 2:
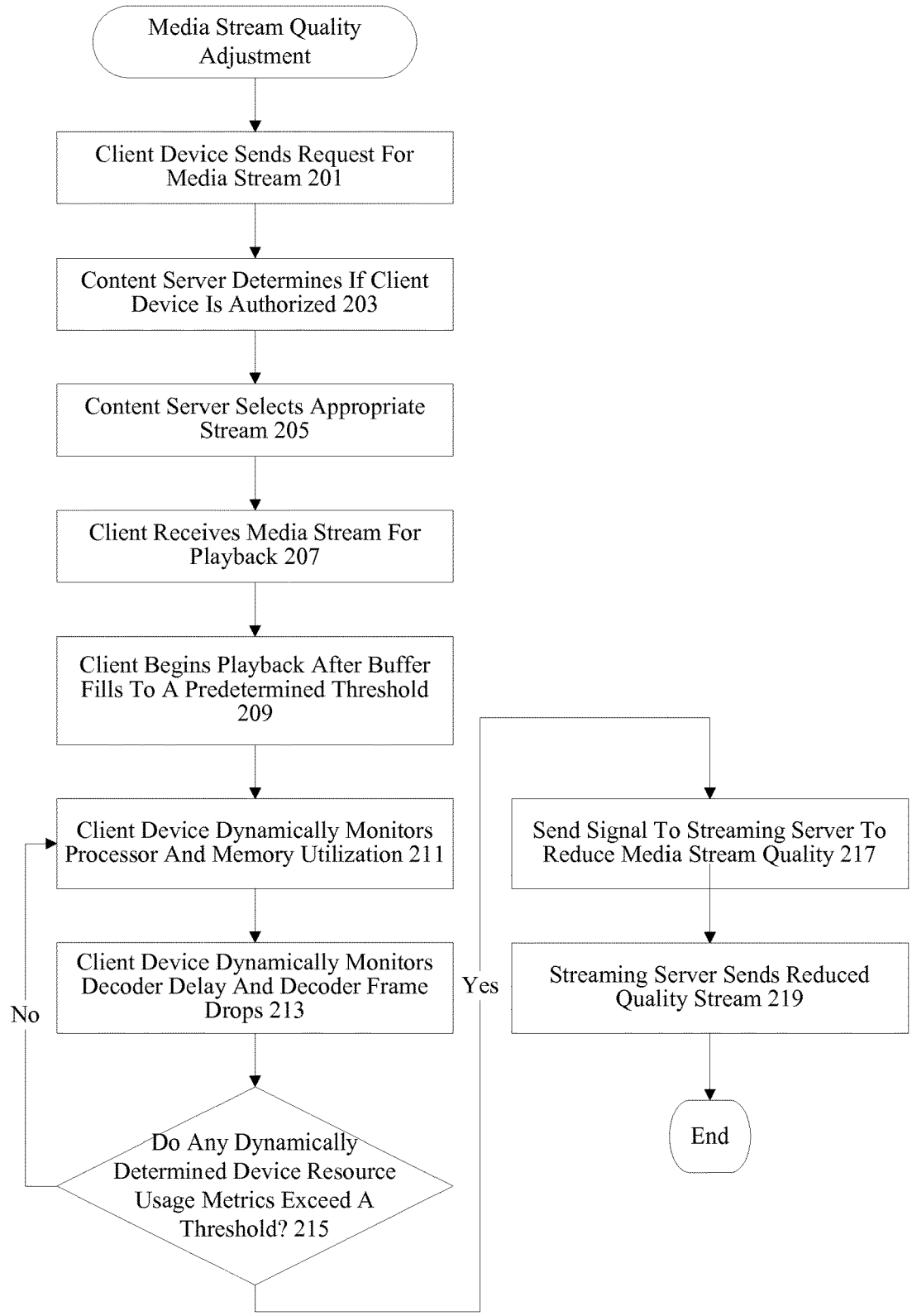
FIG. 2 illustrates one example of a technique for quality adaptation based on real-time processing capabilities.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context particular streaming protocols. However, it should be noted that the techniques of the present invention apply to a variety of protocols. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

The quality of a media stream transmitted to a client device is dynamically adapted based on real-time availability of resources on the client device. Central processing unit resources, memory availability, buffer usage, graphics processing unit usage, etc., are continuously monitored to evaluate the ability of a device to handle media streams of particular quality levels. When it is determined that resources at a client device temporarily can not handle a high quality media stream, a lower quality stream is selected and provided to the client device without having to establish a new session.

Example Embodiments

A variety of mechanisms are used to deliver media streams to devices. In many instances, a media stream can not be played back smoothly at particular times on various devices. Networks may not deliver data at a constant rate. Network bandwidth, latency, throughput, and reliability may all vary depending on network conditions. Consequently, media players at client devices typically have buffers and buffer thresholds used to determine when playback begins or resumes. A large buffer having a high associated buffer threshold will take a long time to build but is tolerates adverse network conditions. A small buffer having a low associated buffer threshold will provide for quick initial playback but is difficult to maintain in many network circumstances. According to various embodiments, a content server selects a stream having a quality level appropriate for a device based on the buffer, network characteristics, resolution, device processor, etc. In particular embodiments, if network conditions do not allow delivery of a high quality stream, the content server selects a lower quality stream for transmission to the device.

However, the techniques and mechanisms of the present invention recognize that even when network conditions allow for sufficient data rates, the device itself may not have sufficient resources to playback a media stream. Although a device may technically meet specifications and have a sufficiently powerful processor, have sufficient memory, etc., dynamic changes in the device itself may render a device incapable of processing and playing a selected stream. For example, the device may be performing tasks such as performing background updates, running a virus/malware scan, copying files, or running some other resource intensive application. The device may no longer have sufficient memory, bus bandwidth, or free processor cycles to perform playback adequately even if device specifications would be adequate.

Consequently, techniques and mechanisms are provided to evaluate not only available data transfer rates of the ntework but also the real-time decoding and rendering capabilities of a client device. Decoding and rendering capabilities of the client device are evaluated by continuously determining central processing unit and memory usage, as well as the rate of dropped frames at the decoder or render. In particular embodiments, the device may receive a media stream as required for smooth playback, but the device may not be able to decode or render media stream frames in time because it is simultaneously performing some other task. Consequently, a streaming server may dynamically switch to sending the device a lower quality stream that is less processor intensive.

According to various embodiments, a streaming server will only dynamically switch to a higher quality stream or will only transmit a high quality stream to a device if there is both available network bandwidth and sufficient dynamic processing resource availability on the client device itself. If the client device detects that it can not decode and render in real time, or if device processor usage or memory usage is too high, the streaming server will seamlessly switch to a lower quality feed, even if there is ample network bandwidth.

In particular examples, a client establishes a session such as a Real-Time Streaming Protocol (RTSP) session. A server computer receives a connection for a media stream, establishes a session, and provides a media stream to a client device. The media stream includes packets encapsulating frames such as MPEG-4 frames. The MPEG-4 frames themselves may be key frames or differential frames. The specific encapsulation methodology used by the server depends on the type of content, the format of that content, the format of the payload, and the application and transmission protocols being used to send the data. After the client device receives the media stream, the client device decapsulates the packets to obtain the MPEG frames and decodes the MPEG frames to obtain the actual media data.

Conventional MPEG-4 files require that a player parse the entire header before any of the data can be decoded. Parsing the entire header can take a notable amount of time, particularly on devices with limited network and processing resources. Consequently, the techniques and mechanisms of the present invention provide a fragmented MPEG-4 framework that allows playback upon receiving a first MPEG-4 file fragment. A second MPEG-4 file fragment can be requested using information included in the first MPEG-4 file fragment. According to various embodiments, the second MPEG-4 file fragment requested may be a fragment corresponding to a higher or lower bit-rate stream than the stream associated with the first file fragment.

MPEG-4 is an extensible container format that does not have a fixed structure for describing media types. Instead, MPEG-4 has an object hierarchy that allows custom structures to be defined for each format. The format description is stored in the sample description ('stsd') box for each stream. The sample description box may include information that may not be known until all data has been encoded. For example, the sample description box may include an average bit rate that is not known prior to encoding.

According to various embodiments, MPEG-4 files are fragmented so that a live stream can be recorded and played back in a close to live manner. MPEG-4 files can be created without having to wait until all content is written to prepare the movie headers. To allow for MPEG-4 fragmentation without out of band signaling, a box structure is provided to include synchronization information, end of file information, and chapter information. According to various embodiments, synchronization information is used to synchronize audio and video when playback entails starting in the middle of a stream. End of file information signals when the current program or file is over. This may include information to continue streaming the next program or file. Chapter information may be used for video on demand content that is broken up into chapters, possibly separated by advertisement slots.

TCP is more widely used than UDP and networking technologies including switch, load balancer, and network card technologies are more developed for TCP than for UDP. Consequently, techniques and mechanisms are provided for delivering fragmented live media over TCP. Sequence information is also maintained and/or modified to allow seamless client device operation. Timing and sequence information in a media stream is preserved.

Requests are exposed as separate files to clients and files should playback on players that handle fragmented MPEG-4. Live or near live, video on demand (VOD), and digital video record (DVR) content can all be handled using fragmentation.

FIG. 1 illustrates dynamic device resource availability monitoring mechanisms. According to various embodiments, a client device and an associated server monitor processor usage 101, memory usage 103, decoder/renderer delay 105, and decoder/renderer frame drops 107. In particular embodiments, processor usage 101 and processor usage history 111 are monitored and reported periodically to a content server. In some examples, processor usage 101 is reported continuously to a content server. In other examples, processor usage 101 is reported only when it exceeds a threshold 121. Similarly, memory usage 103, memory usage history 113, decoder/renderer delay 105, decoder/renderer delay history 115, decoder/render frame drops 107, and decoder/renderer frame drop history 117 can be monitored continuously and reported. According to various embodiments, memory usage 103, decoder/renderer delay 105, and decoderer/renderer frame drops 107 are reported only when they exceed a memory usage threshold 123, a decoder/renderer delay threshold 125, and/or a decoder/renderer frame drop threshold 127. The thresholds may be determined based on average user preferences or individual user preferences.

According to various embodiments, the decoder/renderer delay 105 relates to packets or fragments that have been received by the client device but can not yet be processed by a decoder/renderer. A decoder/renderer may be a hardware or software decoder/renderer that may be busy with other operations. Even though streaming data may arrive in time at the device, the decoder/renderer may not be able to process the streaming data in time.

FIG. 2 illustrates a technique for adjusting the quality of a media stream transmitted to a client device based on dynamically determined client device resource availability. At 201, a client device sends a request to a content server for a media stream. The request may include a client identifier as well as device characteristics. At 203, the content server determines if the client device is authoried to receive the media stream. At 205, the content selects a stream appropriate for the client device based on factors such as subscription level, client device screen size, screen resolution, processor type, memory size, type of network connection, etc. At 207, the client receives the stream for playback. According to various embodiments, the client buffers the stream initially and begins playback at 209 only after the buffer has filled to a predetermined threshold. In particular embodiments, the client device dynamically monitors processor utilization and memory usage at 211. According to various embodiments, the client device may also dynamically monitor decoder delay and decoder frame drops at 213. Delay and frame drops attributable to the decoder may cause buffer overflow, as frames continue to be received by the client device but can not be displayed.

According to various embodiments, if the client device determines that processor utilization, memory usage, decoder delay, and/or decoder frame drops exceed a particular threshold at 215, the client device sends a signal to the streaming server to send a stream that uses less client device processing resources at 217. The stream that uses less client device processing resources may be a stream with a lower resolution, lower frame rate, a smaller number of colors, reduced audio quality, etc., or it may even be a stream encoded in a different manner. At 219, the content server sends the reduced quality stream even if network resources are sufficient to deliver the higher quality stream.

At 221, the client device monitors resource usage and sends a signal to a content server to possibly increase media stream quality if sufficient processing resources, memory resources, and decoder resources are available for a predetermined period of time. At 223, the content server can send a higher quality stream to the client device if both sufficient network resources are currently available and sufficient device resources are currently available.

In particular embodiments, data such as fragmented MPEG-4 packets are received at the client device. The content server may replace MPEG-4 fragments with higher or lower quality MPEG-4 fragments all while maintaining timing and sequence number information.

Figure 3:
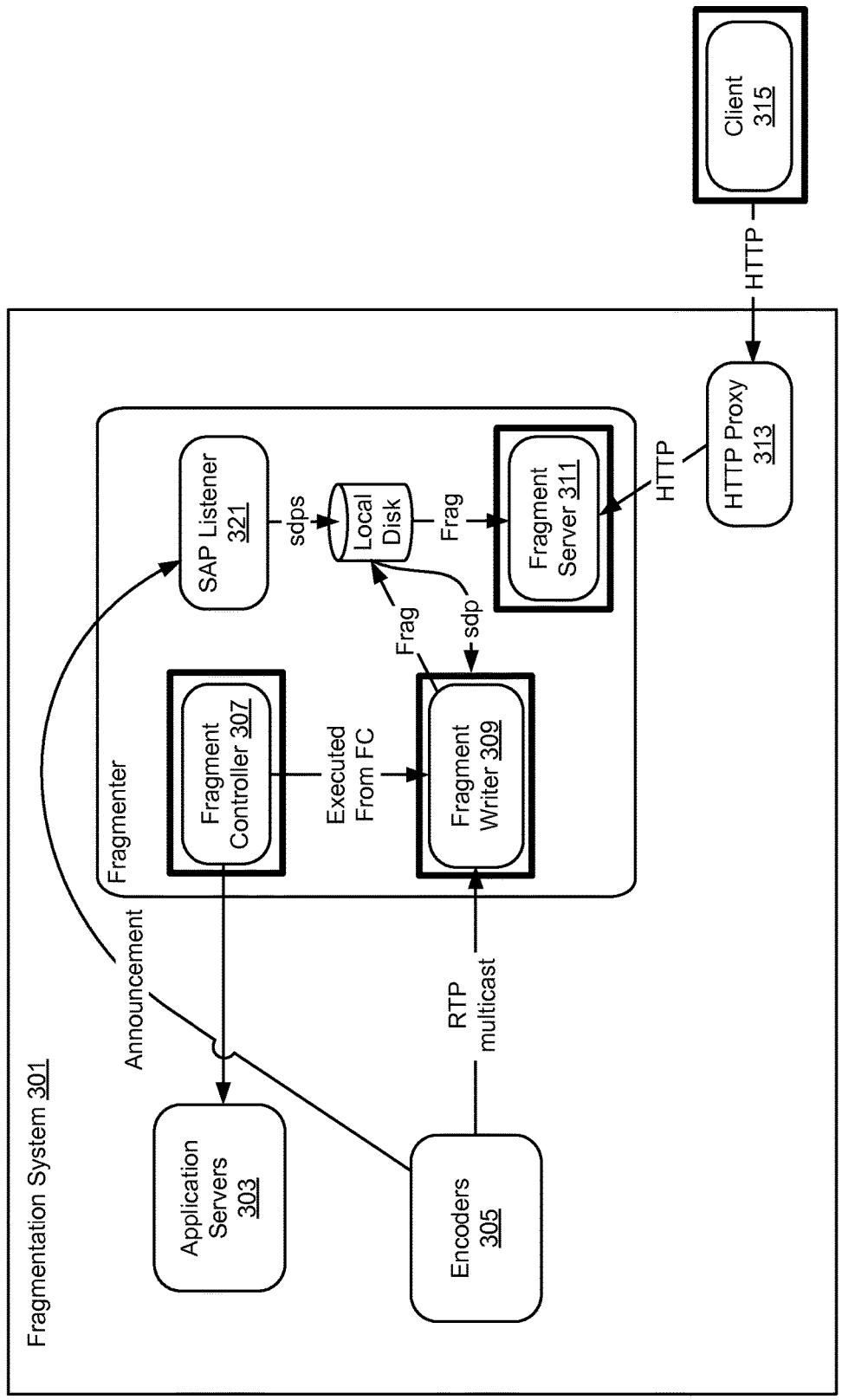
FIG. 3 illustrates one example of a fragmentation system.

In some examples, if device resources are constrained, the stream is switched to a lower quality stream that allows playback of more content with fewer transmitted MPEG-4 fragments. Alternatively, if device resources are ample, the content server can begin transmitting a higher quality stream while maintaining a seamless user viewing experience. A content server can quality shift a stream based on dynamically determined client device resource usage FIG. 3 is a diagrammatic representation illustrating one example of a fragmentation system 301 associated with a content server that can use the techniques and mechanisms of the present invention. Encoders 305 receive media data from satellite, content libraries, and other content sources and sends RTP multicast data to fragment writer 309. The encoders 305 also send session announcement protocol (SAP) announcements to SAP listener 321. According to various embodiments, the fragment writer 309 creates fragments for live streaming, and writes files to disk for recording. The fragment writer 309 receives RTP multicast streams from the encoders 305 and parses the streams to repackage the audio/video data as part of fragmented MPEG-4 files. When a new program starts, the fragment writer 309 creates a new MPEG-4 file on fragment storage and appends fragments. In particular embodiments, the fragment writer 309 supports live and/or DVR configurations.

The fragment server 311 provides the caching layer with fragments for clients. The design philosophy behind the client/server API minimizes round trips and reduces complexity as much as possible when it comes to delivery of the media data to the client 315. The fragment server 311 provides live streams and/or DVR configurations.

The fragment controller 307 is connected to application servers 303 and controls the fragmentation of live channel streams. The fragmentation controller 307 optionally integrates guide data to drive the recordings for a global/network DVR. In particular embodiments, the fragment controller 307 embeds logic around the recording to simplify the fragment writer 309 component. According to various embodiments, the fragment controller 307 will run on the same host as the fragment writer 309. In particular embodiments, the fragment controller 307 instantiates instances of the fragment writer 309 and manages high availability.

According to various embodiments, the client 315 uses a media component that requests fragmented MPEG-4 files, allows trick-play, and manages bandwidth adaptation. The client communicates with the application services associated with HTTP proxy 313 to get guides and present the user with the recorded content available.

Figure 4:
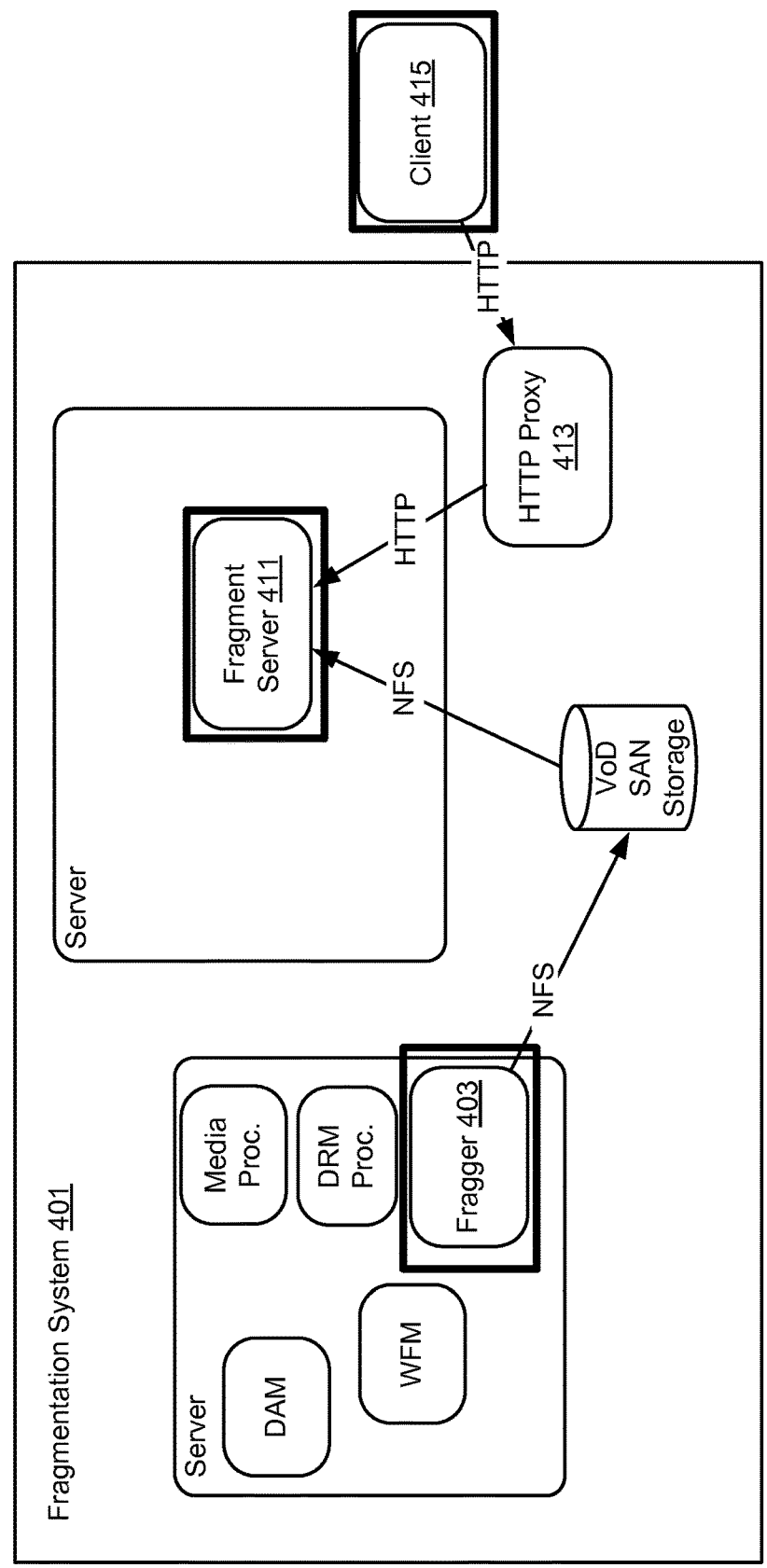
FIG. 4 illustrates another example of a fragmentation system.

FIG. 4 illustrates one example of a fragmentation system 401 that can be used for video on demand content. Fragger 403 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 411 provides the caching layer with fragments for clients. The design philosophy behind the client/server API minimizes round trips and reduces complexity as much as possible when it comes to delivery of the media data to the client 415. The fragment server 411 provides VoD content.

According to various embodiments, the client 415 uses a media component that requests fragmented MPEG-4 files, allows trick-play, and manages bandwidth adaptation. The client communicates with the application services associated with HTTP proxy 413 to get guides and present the user with the recorded content available.

Figure 5:
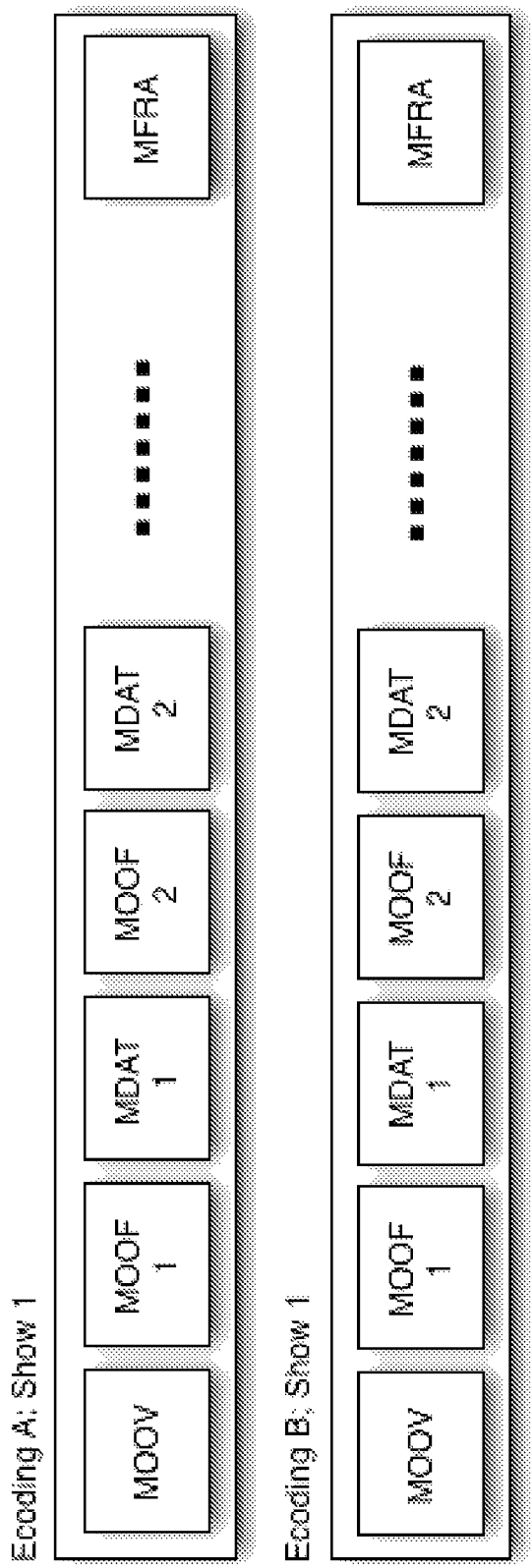
FIG. 5 illustrates examples of files stored by a fragment writer.

FIG. 5 illustrates examples of files stored by the fragment writer. According to various embodiments, the fragment writer is a component in the overall fragmenter. It is a binary that uses command line arguments to record a particular program based on either NTP time from the encoded stream or wallclock time. In particular embodiments, this is configurable as part of the arguments and depends on the input stream. When the fragment writer completes recording a program it exits. For live streams, programs are artificially created to be short time intervals e.g. 5-15 minutes in length.

According to various embodiments, the fragment writer command line arguments are the SDP file of the channel to record, the start time, end time, name of the current and next output files. The fragment writer listens to RTP traffic from the live video encoders and rewrites the media data to disk as fragmented MPEG-4. According to various embodiments, media data is written as fragmented MPEG-4 as defined in MPEG-4 part 12 (ISO/IEC 14496-12). Each broadcast show is written to disk as a separate file indicated by the show ID (derived from EPG). Clients include the show ID as part of the channel name when requesting to view a prerecorded show. The fragment writer consumes each of the different encodings and stores them as a different MPEG-4 fragment.

In particular embodiments, the fragment writer writes the RTP data for a particular encoding and the show ID field to a single file. Inside that file, there is metadata information that describes the entire file (MOOV blocks). Atoms are stored as groups of MOOF/MDAT pairs to allow a show to be saved as a single file. At the end of the file there is random access information that can be used to enable a client to perform bandwidth adaptation and trick play functionality.

According to various embodiments, the fragment writer includes an option which encrypts fragments to ensure stream security during the recording process. The fragment writer will request an encoding key from the license manager. The keys used are similar to that done for DRM. The encoding format is slightly different where MOOF is encoded. The encryption occurs once so that it does not create prohibitive costs during delivery to clients.

The fragment server responds to HTTP requests for content. According to various embodiments, it provides APIs that can be used by clients to get necessary headers required to decode the video, seek to any desired time frame within the fragment and APIs to watch channels live. Effectively, live channels are served from the most recently written fragments for the show on that channel. The fragment server returns the media header (necessary for initializing decoders), particular fragments, and the random access block to clients. According to various embodiments, the APIs supported allow for optimization where the metadata header information is returned to the client along with the first fragment. The fragment writer creates a series of fragments within the file. When a client requests a stream, it makes requests for each of these fragments and the fragment server reads the portion of the file pertaining to that fragment and returns it to the client.

According to various embodiments, the fragment server uses a REST API that is cache friendly so that most requests made to the fragment server can be cached. The fragment server uses cache control headers and ETag headers to provide the proper hints to caches. This API also provides the ability to understand where a particular user stopped playing and to start play from that point (providing the capability for pause on one device and resume on another).

In particular embodiments, client requests for fragments follow the following format: http://{HOSTNAME}/frag/{CHANNEL}/{BITRATE}/[{ID}/]{COMMAND}[/{ARG}] e.g. http://frag.hosttv.com/frag/1/H8QVGAH264/1270059632.mp4/fragment/42. According to various embodiments, the channel name will be the same as the backend-channel name that is used as the channel portion of the SDP file. VoD uses a channel name of "vod". The BITRATE should follow the BITRATE/RESOLUTION identifier scheme used for RTP streams. The ID is dynamically assigned. For live streams, this may be the UNIX timestamp; for DVR this will be a unique ID for the show; for VoD this will be the asset ID. The ID is optional and not included in LIVE command requests. The command and argument are used to indicate the exact command desired and any arguments. For example, to request chunk 42 this portion would be "fragment/42".

The URL format makes the requests content delivery network (CDN) friendly because the fragments will never change after this point so two separate clients watching the same stream can be serviced using a cache. In particular, the headend architecture leverages this to avoid too many dynamic requests arriving at the Fragment Server by using an HTTP proxy at the head end to cache requests.

According to various embodiments, the fragment controller is a daemon that runs on the fragmenter and manages the fragment writer processes. We propose that it uses a configured filter that is executed by the Fragment Controller to generate the list of broadcasts to be recorded. This filter integrates with external components such as a guide server to determine which shows to record and the broadcast ID to use.

According to various embodiments, the client includes an application logic component and a media rendering component. The application logic component presents the UI for the user and also communicates to the front-end server to get shows that are available for the user and to authenticate. As part of this process, the server returns URLs to media assets that are passed to the media rendering component.

In particular embodiments, the client relies on the fact that each fragment in a fragmented MP4 file has a sequence number. Using this knowledge and a well defined URL structure for communicating with the server, the client requests fragments individually as if it was reading separate files from the server simply by requesting urls for files associated with increasing sequence numbers. In some embodiments, the client can request files corresponding to higher or lower bit rate streams depending on device and network resources.

Since each file contains the information needed to create the URL for the next file, no special playlist files are needed, and all actions (startup, channel change, seeking) can be performed with a single HTTP request. After each fragment is downloaded the client assesses among other things the size of the fragment and the time needed to download it in order to determine if downshifting is needed, or if there is enough bandwidth available to request a higher bitrate.

Because each request to the server looks like a request to a separate file, the response to requests can be cached in any HTTP Proxy, or be distributed over any HTTP based CDN.

Figure 6:
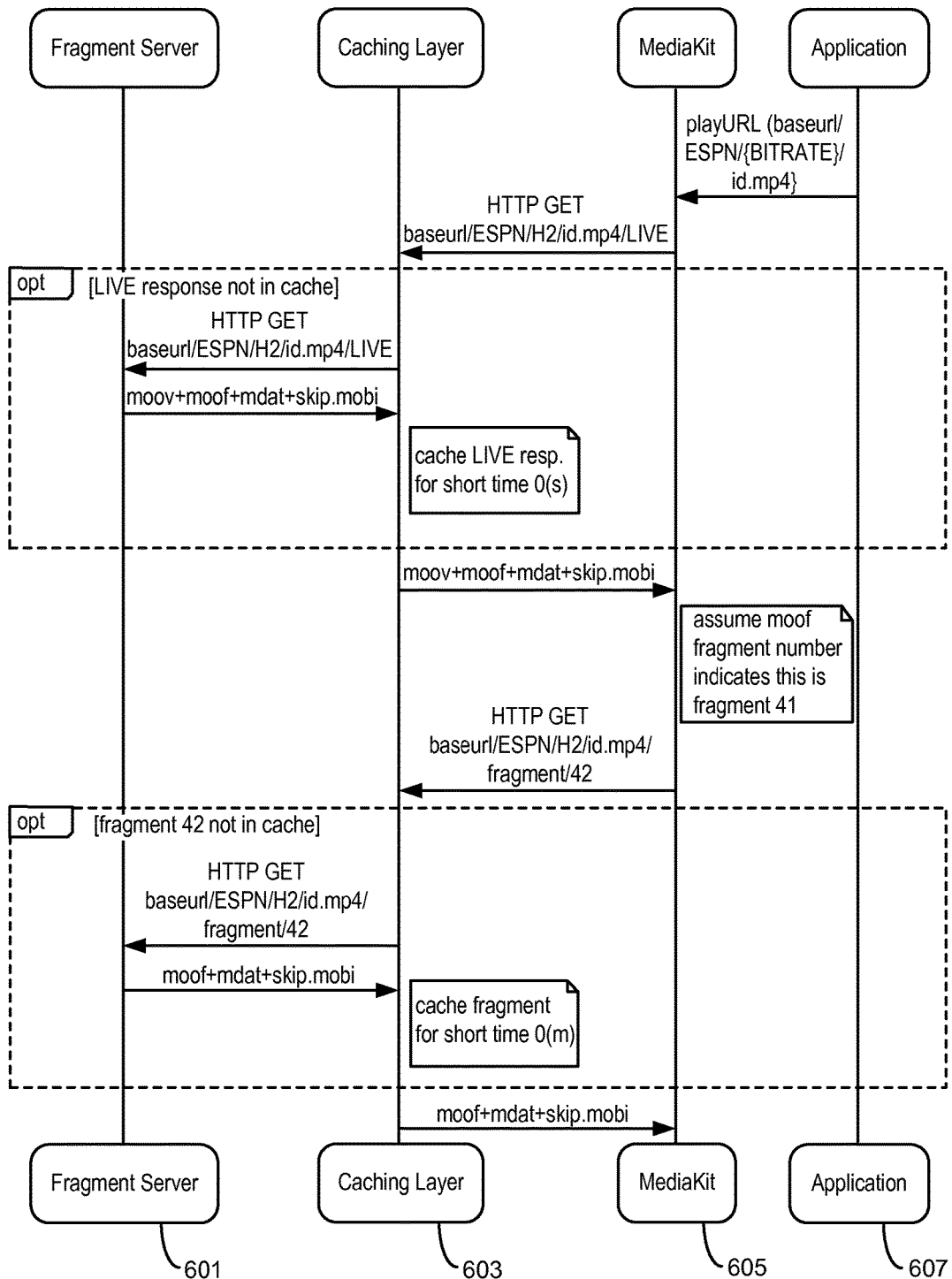
FIG. 6 illustrates one example of an exchange used with a fragmentation system.

FIG. 6 illustrates an interaction for a client receiving a live stream. The client starts playback when fragment plays out from the server. The client uses the fragment number so that it can request the appropriate subsequence file fragment. An application such as a player application 607 sends a request to mediakit 605. The request may include a base address and bit rate. The mediakit 605 sends an HTTP get request to caching layer 603. According to various embodiments, the live response is not in cache, and the caching layer 603 forward the HTTP get request to a fragment server 601. The fragment server 601 performs processing and sends the appropriate fragment to the caching layer 603 which forwards to the data to mediakit 605.

The fragment may be cached for a short period of time at caching layer 603. The mediakit 605 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 605 may request a next fragment having a different data rate. In some instances, the mediakit 605 may request a next fragment having a higher data rate. According to various embodiments, the fragment server 601 maintains fragments for different quality of service streams with timing synchronization information to allow for timing accurate playback.

The mediakit 605 requests a next fragment using information from the received fragment. According to various embodiments, the next fragment for the media stream may be maintained on a different server, may have a different bit rate, or may require different authorization. Caching layer 603 determines that the next fragment is not in cache and forwards the request to fragment server 601. The fragment server 601 sends the fragment to caching layer 603 and the fragment is cached for a short period of time. The fragment is then sent to mediakit 605.

FIG. 7 illustrates one example of a computer system. According to particular embodiments, a system 700 suitable for implementing particular embodiments of the present invention includes a processor 701, a memory 703, an interface 711, and a bus 715 (e.g., a PCI bus or other interconnection fabric) and operates as a streaming server. When acting under the control of appropriate software or firmware, the processor 701 is responsible for modifying and transmitting live media data to a client. Various specially configured devices can also be used in place of a processor 701 or in addition to processor 701. The interface 711 is typically configured to send and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 700 is a fragment server that also includes a transceiver, streaming buffers, and a program guide database. The fragment server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the fragment server handles requests and responses for media content related transactions while a separate streaming server provides the actual media streams.

Although a particular fragment server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method, comprising:
   sending a first request to a content server for receiving a media stream at a first quality level;
   beginning playback of the media stream at a client device at the first quality level;
   dynamically monitoring, by the client device, hardware resource usage at the client device;
   determining that the hardware resource usage at the client device is insufficient for allowing playback of the media stream at the first quality level;
   sending a signal to the content server to reduce the quality of the media stream from the first quality level to a second quality level;
   sending a subsequent signal to the content server to increase the quality of the media stream from the second quality level back to the first quality level after determining that hardware resource usage at the client device has become sufficient for allowing playback of the media stream at the first quality level;
   wherein determining that the hardware resource usage at the client device is insufficient for allowing playback of the media stream at the first quality level includes determining whether the hardware resource usage at the client device exceeds a threshold, wherein resource usage at the client device exceeds the threshold when decoder frame drops at the client device exceeds a decoder frame drop threshold.

2. The method of claim 1, wherein hardware resource usage exceeds the threshold when processor usage at the client device exceeds a processor usage threshold.

3. The method of claim 1, wherein hardware resource usage at the client device exceeds the threshold when memory at the client device exceeds a memory usage threshold.

4. The method of claim 1, wherein the client device communicates with the content server via HTTP protocol.

5. The method of claim 1, wherein the media stream is a fragmented MPEG-4 media stream.

6. The method of claim 1, wherein the first quality level of the media stream is requested based on known characteristics of the client device.

7. The method of claim 1, wherein the first quality level of the media stream is requested based on a subscription level.

8. The method of claim 1, wherein the client device also receives the media stream at a third quality level from the content server in a same session as receiving the media stream at the first quality level.

9. A system, comprising:
   a processor; and
   memory, wherein the memory stores instructions for:
      sending a first request to a content server for receiving a media stream at a first quality level;
      beginning playback of the media stream at a client device at the first quality level;
      dynamically monitoring, by the client device, hardware resource usage at the client device;
      determining that the hardware resource usage at the client device is insufficient for allowing playback of the media stream at the first quality level;
      sending a signal to the content server to reduce the quality of the media stream from the first quality level to a second quality level;
      sending a subsequent signal to the content server to increase the quality of the media stream from the second quality level back to the first quality level after determining that hardware resource usage at the client device has become sufficient for allowing playback of the media stream at the first quality level;

wherein determining that the hardware resource usage at the client device is insufficient for allowing playback of the media stream at the first quality level includes determining whether the hardware resource usage at the client device exceeds a threshold, wherein resource usage at the client device exceeds the threshold when decoder frame drops at the client device exceeds a decoder frame drop threshold.

10. The system of claim 9, wherein hardware resource usage exceeds the threshold when processor usage at the client device exceeds a processor usage threshold.

11. The system of claim 9, wherein hardware resource usage at the client device exceeds the threshold when memory at the client device exceeds a memory usage threshold.

12. The system of claim 9, wherein the client device communicates with the content server via HTTP protocol.

13. The system of claim 9, wherein the media stream is a fragmented MPEG-4 media stream.

14. The system of claim 9, wherein the first quality level of the media stream is requested based on known characteristics of the client device.

15. The system of claim 9, wherein the first quality level of the media stream is requested based on a subscription level.

16. The system of claim 9, wherein the client device also receives the media stream at a third quality level from the content server in a same session as receiving the media stream at the first quality level.

* * * * *